(12) United States Patent
Ghadialy

(10) Patent No.: US 9,756,487 B1
(45) Date of Patent: Sep. 5, 2017

(54) SYSTEMS AND METHODS FOR PERSONALIZED TEXT MESSAGE MARKETING

(71) Applicant: Majeed Ghadialy, Fremont, CA (US)

(72) Inventor: Majeed Ghadialy, Fremont, CA (US)

( * ) Notice: Subject to any disclaimer, the term of this patent is extended or adjusted under 35 U.S.C. 154(b) by 0 days.

(21) Appl. No.: 15/207,408

(22) Filed: Jul. 11, 2016

Related U.S. Application Data

(60) Provisional application No. 62/193,027, filed on Jul. 15, 2015.

(51) Int. Cl.
| | | |
|---|---|---|
| *H04W 4/00* | (2009.01) | |
| *H04W 4/14* | (2009.01) | |
| *H04L 29/12* | (2006.01) | |
| *H04W 4/16* | (2009.01) | |
| *H04W 8/26* | (2009.01) | |
| *H04M 3/54* | (2006.01) | |
| *H04M 3/42* | (2006.01) | |

(52) U.S. Cl.
CPC ............ *H04W 4/14* (2013.01); *H04L 61/605* (2013.01); *H04W 4/16* (2013.01); *H04M 3/42263* (2013.01); *H04M 3/54* (2013.01); *H04W 8/26* (2013.01)

(58) Field of Classification Search
CPC .... H04M 3/54; H04M 3/42263; H04M 15/09; H04M 2203/2011; H04M 2207/12; H04M 3/42034; H04M 3/42051; H04M 3/5234; H04M 7/006; H04M 2203/1091; H04M 3/42229; H04Q 2213/13282; H04Q 2213/13224

USPC .............. 379/211.02, 212.01, 100.15, 88.17, 379/144.21; 455/412.1, 412.2, 413, 41.3, 455/426.1, 426.2, 432.3, 435.2, 445, 458, 455/414.1, 417

See application file for complete search history.

(56) References Cited

U.S. PATENT DOCUMENTS

| | | | | |
|---|---|---|---|---|
| 8,036,362 | B1 * | 10/2011 | Skinner ................ | H04M 3/4211 379/211.01 |
| 2010/0293239 | A1 * | 11/2010 | Cross .................... | H04L 12/581 709/206 |
| 2014/0165173 | A1 * | 6/2014 | Hjelm ..................... | H04L 63/08 726/7 |

* cited by examiner

*Primary Examiner* — Fred Casca
(74) *Attorney, Agent, or Firm* — Sheppard Mullin Richter & Hampton LLP

(57) ABSTRACT

Systems, methods, and non-transitory computer readable media are configured to transmit a communication to a first computing device associated with a first person, wherein the communication includes an indication that the communication is from a phone number. A response to the communication is received from the first computing device. The response is routed to a second computing device associated with a second person and a second phone number. A reply to the response is received from the second computing device. The reply is transmitted to the first computing device, wherein the reply includes an indication that the reply is from the phone number.

19 Claims, 13 Drawing Sheets

82

84

US 9,756,487 B1

SYSTEMS AND METHODS FOR PERSONALIZED TEXT MESSAGE MARKETING

CROSS-REFERENCE TO RELATED APPLICATIONS

The present application claims priority to U.S. Provisional Application No. 62/193,027, filed on Jul. 15, 2015, the entire contents of which are incorporated by reference as if fully set forth herein.

FIELD OF THE INVENTION

The present technology relates to the electronic communications. More particularly, the present technology relates to techniques for optimizing text messaging.

BACKGROUND

Business owners, including small business owners, seek efficient ways to engage their customers in a manner that is relationship-based. They seek customer engagement that achieves long term "stickiness" (e.g., customer retention) and also realizes future growth (e.g., new customer acquisition). To promote these goals, business owners often adopt marketing techniques involving text based communications. Certain characteristics of conventional text based communications in comparison to other marketing techniques are more supportive of these goals. For example, it has been observed that a large percentage of text messages are read in a relatively short time from receipt.

SUMMARY

Various embodiments of the present technology can include systems, methods, and non-transitory computer readable media configured to generate a communication automatically based on industry-specific best practices and computer algorithms applied to business data and information, transmit this communication to a first computing device associated with a first person, wherein the communication includes an indication that the communication is from a phone number. A response to the communication is received from the first computing device. The response is routed to a second computing device associated with a second person and a second phone number. A reply to the response is received from the second computing device. This response can be automatically generated using computing systems or manually entered by a human being. The reply is transmitted to the first computing device, wherein the reply includes an indication that the reply is from the phone number. The present technology provides bidirectional communication mechanism as well as supports a seamless transition between automated communication and manual communication. Thus, it combines the advantages of automation such as high-volume scaling, cost & time savings with the advantages of human to human communication such as deep impact of personal touch setting the communication apart from all the other distractions current consumers of technology experience every few minutes. The present technology also enables high level of customer satisfaction by offering a bi-directional communication channel that enables the consumer to ask question and get support and help in response to a marketing message.

In an embodiment, the communication, the response, and the reply are text messages or phone calls.

In an embodiment, the reply to the first computing device does not include an indication that the reply is from the second phone number.

In an embodiment, the response is associated with the phone number.

In an embodiment, the routing the response to a second computing device comprises forwarding the response under the phone number.

In an embodiment, the second phone number associated with the second computing device is removed from the reply.

In an embodiment, a phone call is received from the first computing device based on dialing of the phone number. The phone call is routed to the second computing device or a third computing device associated with a third person. Voice communications between the first computing device and the second computing device are established.

In an embodiment, the computing system is administered by a business entity, the first computing device is associated with a consumer of the business entity, and the second computing device is associated with a business staff of the business entity.

In an embodiment, the communication is a text message. A recipient for the communication, a time to send the communication to the recipient, and content for the communication are determined based on configuration parameters applied to one or more rules.

In an embodiment, a channel for the communication is selected based on at least one of urgency of the communication, operability of the channel, availability of the channel, latency of the channel, and communication variety, the channel relating to at least one of messaging, email, and mobile phone.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
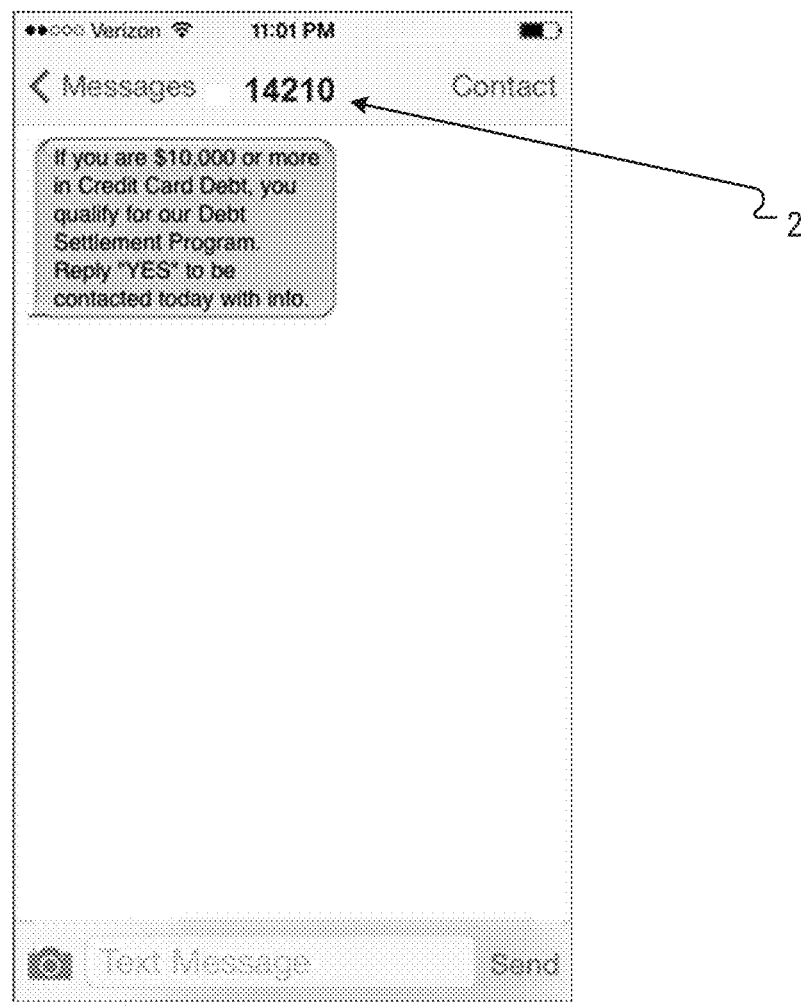
FIG. 1 illustrates a conventional text message.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Personalized Text Message Marketing

As mentioned, business owners, including small business owners, want an efficient way to engage their customers in a manner that is relationship-based. They seek customer engagement that achieves long term "stickiness" (e.g., customer retention) and also realizes future growth (e.g., new customer acquisition). To promote these goals, business owners often adopt conventional marketing techniques involving conventional text based communications rooted in computer technology. Certain characteristics of such conventional text based communications in comparison to other marketing techniques are more supportive of these goals. For example, it has been observed that a large percentage of text messages are read in a relatively short time from receipt.

However, marketing techniques involving conventional text based communications can pose a variety of disadvantages. For example, conventional text based communications are mostly "batch and blast" in nature. In this regard, a business owner or administrator associated with the business owner can upload a list of phone numbers, type a text message, and transmit practically the same text message to all recipients at practically the same time. Little or no customization can be implemented. As another example, conventional text based communications are designed for one-way information dissemination. A consumer or recipient of a text message cannot text back and reach a mobile phone of a human being to conduct dialog. As yet another example, conventional text based communications are mostly impersonal and not relevant. While some conventional techniques may support variable replacements in the body of a text message, such conventional techniques can be unduly burdensome for a significant number of business owners to implement. As a result, completely impersonalized text messages are sent to a group of consumers in a significant number of instances.

In addition, conventional text based communications do not support the ability to individually time transmission of a text message. Instead, the entire batch goes out in essentially one transmission. Text messages in a batch sometimes can be scheduled over the course of a few days but there is little or no control over timing of an individual text message. As a result, optimal transmission and receipt of a text message can be elusive. For example, in the income tax preparation business, some clients like to do their taxes early in the season (e.g., January) while others wait until late in the season (e.g., April). Sending a reminder in the form of a text message to all clients in January (or in April) does not accommodate individualized preferences of clients and hence can render the text messages irrelevant or even annoying.

Further, use of "short codes" in conventional text based communications is problematic. FIG. 1 illustrates a mobile phone screen of a consumer when receiving an SMS text message based on conventional text based communications. As shown, conventional techniques can use a short code 2 of a predetermined number of digits (e.g., five digits, six digits, etc.) for sending out text messages. In the example shown, the short code is "14210". While this approach involving short codes allows for high throughput in delivery of large volumes of text messages, the approach can make consumers feel as if they are dealing with a computer not a fellow human being. This type of consumer reaction can drastically reduce the marketing effectiveness of the text messages. Another problem with short codes is that the consumers cannot make a phone call to a short code because the short code is not a phone number supported by phone carriers for voice calls. This can reduce the marketing effectiveness even further.

Another disadvantage of conventional text based communications is that they can require time and effort from staff of a business to create "batch and blast" marketing campaigns. For each batch of messages, the business staff must review the list of contacts to send messages, they must provide and/or update the message that needs to be sent, and then they must schedule the batch. Once the batch is sent, the conventional solutions stop and do not take any further action until the staff members take the time and effort to create the next batch. This is very burdensome on business owners, especially small business owners, who are commonly understaffed and overworked. Oftentimes, the business staff get busy with running the day-to-day operations and do not setup new batches of text messages. This results in lost opportunity to create engagement with clients which could have resulted in higher growth in business.

Moreover, conventional text based communications tend to be "horizontal" tools and accordingly fail to reflect domain (or "vertical") best practices for different industries. For example, timing, recipient-selection, content, and reasons for sending text messages to clients or prospects in an income tax preparation office are very different from a dentist office. Conventional techniques can be incapable of accounting for domain specific best practices, thus posing a significant limitation in their adoption and use.

An improved approach rooted in computer technology overcomes the foregoing and other disadvantages associated with conventional approaches specifically arising in the realm of computer technology. Systems, methods, and computer readable media of the present technology can allow a system associated with a business entity to transmit a communication, such as a text message, to a computing device of a consumer of the business entity. The communication can include an indication that the text message is from a phone number associated with the business entity. Using the computing device of the consumer, the consumer can provide a communication, such as a text message, constituting a response to the original text message. The response can include an indication that the response is from the phone number of the computing device of the consumer. The system can receive the response and route the response to a computing device of business staff associated with the business entity. The computing device of the business staff can be associated with a phone number. The system can remove the phone number of the computing device of the consumer from the response and instead associate the response with the phone number associated with the business entity. The business staff can transmit a communication, such as a text message, constituting a reply to the response using the computing device of the business staff. The reply can be directed to the system based on the phone number associated with the business entity. The reply can include an indication that the reply is from the phone number associated with the business entity. The phone number of the computing device of the business staff can be removed from the reply, thereby protecting their privacy. The system can route the reply to the computing device of the consumer. If consumer chooses to initiate a voice communication with the business entity, the consumer can select the phone number associated with the business entity as indicated in the reply to initiate a phone call. The system can receive the phone call and route the phone call to the business staff that transmitted the reply and establish voice communications between the computing device of the business staff and the computing device of the consumer. Although text messages are sometimes described herein for ease of illustration, the present technology can be applied to other forms of messages or communications in accordance with other messaging services and communication systems or protocols. More details regarding the present technology are described herein.

The present technology poses many advantages over conventional text based communications. The present technology can empower businesses to carry on a human-to-human conversation with a consumer supported by text messaging, phone calls, and other forms of communication using conventional phone numbers in a manner that embodies and automates industry specific best practices. Businesses benefit because they are enabled to reach out to customers and prospects at an individual level, at the right time, for the right reason, and with a personalized communication, such as a text message. This is done while following industry best practices that businesses intuitively know and naturally want incorporated into their important business activities, such as marketing campaigns and communications with their customers and prospects. The present technology allows businesses to realize these advantages in an automated manner without requiring significant time and effort. In addition, consumers benefit because they are able to receive one-on-one attention through a bidirectional dialog with a business and their staff on whom they depend for customer service. As part of this dialog, consumers not only can receive marketing information from the business, they also can request and receive customer service quickly and conveniently. Accordingly, the present technology represents a win-win for businesses and consumers.

Figure 2:
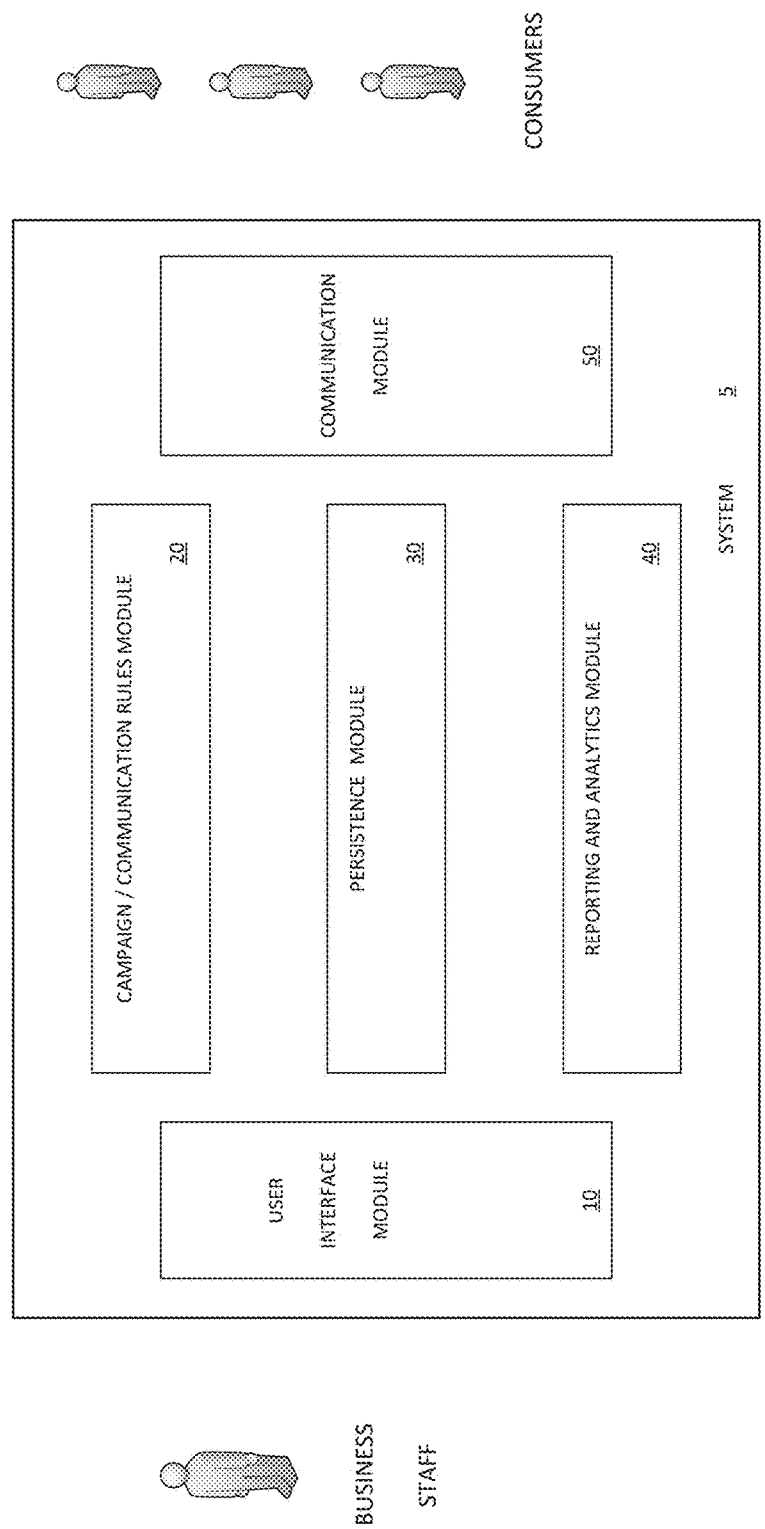
FIG. 2 illustrates an example system, according to an embodiment of the present technology.

FIG. 2 illustrates an example computerized system 5 that resides between staff of a business and consumers in a manner that is transparent to the consumers, according to an embodiment of the present technology. In some embodiments, the system 5 can be controlled or administered by a business to manage communications with its consumers. For instance, the system 5 can be implemented on one or more servers controlled by the business. In some embodiments, the system 5 can be controlled or administered by an organization as a software-as-a-service offered to a business to allow the business to manage communications with its consumers. Based on its various functionalities as represented by example modules, the system 5 can initiate and power highly relevant, personalized, and timely interaction in the form of communications, such as text messages, between the consumer and the business staff. The system 5 can include a user interface module 10, a campaign/communication rules module 20, a persistence module 30, a reporting and analytics module 40, and a communication module 50. The user interface module 10 can enable business staff to interact and control the system 5 in various manners as described in more detail herein. The campaign/communication rules module 20 can work as a knowledge base and decision making machine that determines to whom to send a communication, such as a text message, when to send the communication, and appropriate content for the communication. The persistence module 30 can persist or store data and information of various kinds and make them available in a format and at a time requested by other modules of the system 5. The reporting and analytics module 40 can process the data from all entities interacting with the system 5 to create reports to be consumed by business staff and can provide actionable analytics and data to empower decision making by the campaign/communication rules module 20 as well as the communication module 50. The communication module 50 can power the actual touch point with consumers via various communication channels. The communication module 50 also can enable non-browser based interaction with the businesses staff as well.

The components (e.g., modules, sub modules, elements, steps, blocks, etc.) shown in this figure and all figures herein are exemplary only, and other implementations may include additional, fewer, integrated, or different components. Some components may not be shown so as not to obscure relevant details. In various embodiments, one or more of the functionalities or other modules (or sub modules) described in connection with the system 5 can be implemented in any suitable combinations.

The description herein of various embodiments of the present technology uses terms in an exemplary fashion for ease of illustration. However, the various embodiments of the present technology are not limited to the illustrations. For example, as used herein, a business can include a business, a business entity, a for-profit entity, a non-profit entity, a government entity, a private entity, a public entity, or any other type of organization or group that is interested in marketing or building a relationship with target recipients, such as consumers. As another example, as used herein, a consumer can include a consumer, a customer, a prospect, a recipient, or any other member of a target audience. As yet another example, as used herein, a communication can include any suitable communication or message, such as a text message, an email, etc. As yet still another example, as used herein, a text message can include an SMS text message or any other type of suitable text message. As yet further another example, although a mobile phone or computing device is sometimes referenced herein as an illustration, the present technology can apply equally to a cell phone, a laptop, a tablet, or other type of mobile or non-mobile computing device.

In some embodiments, the system 5 can be implemented, in part or in whole, as software, hardware, or any combination thereof. In general, one or more functions, tasks, and/or operations of modules can be carried out or performed by software routines, software processes, hardware, and/or any combination thereof. In some cases, the system 5 can be, in part or in whole, implemented as software running on one or more computing devices or systems, such as on a server or a client computing device.

Figure 3:
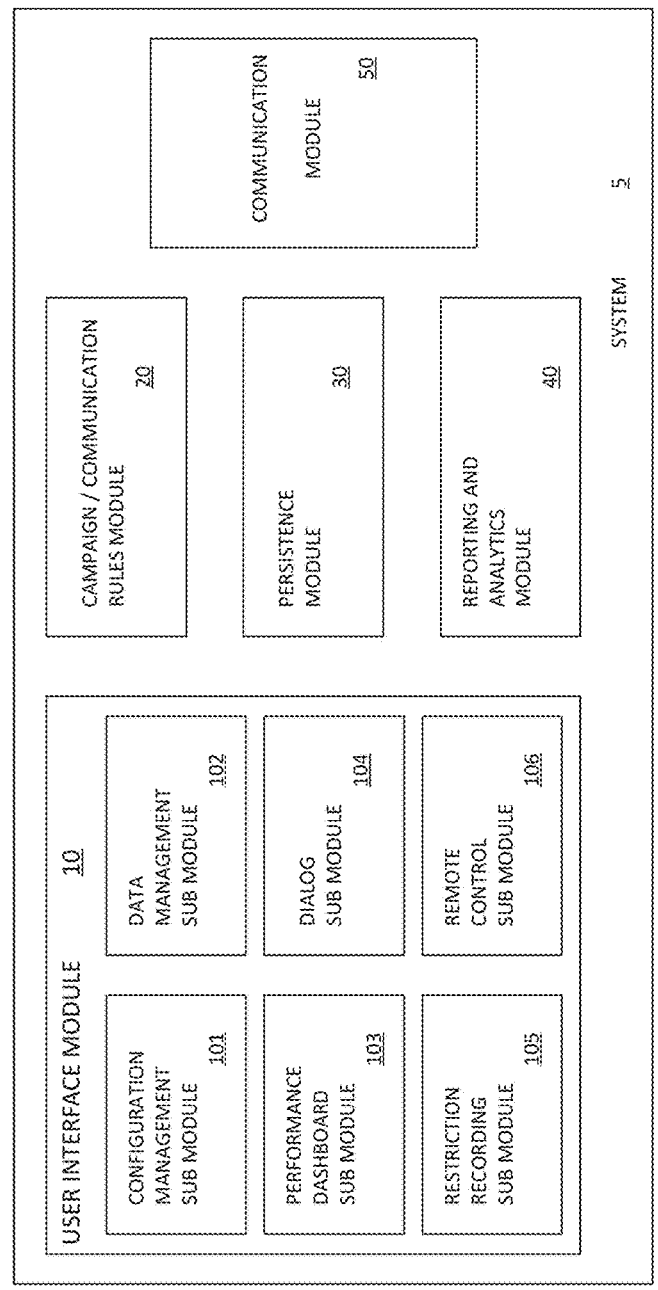
FIG. 3 illustrates an example interface module, according to an embodiment of the present technology.

FIG. 3 illustrates an example of the user interface module 10, according to an embodiment of the present technology. The user interface module 10, for example, can enable business staff to review and configure parameters within campaign/communication rules; create new campaigns/communication rules; review and update message templates; activate/deactivate campaigns/communication rules; review performance reports and analyze important metrics; control various aspects of behavior of the system 5, via a computer/browser interface, a phone application interface, text messaging, or email; and respond to communications received from the consumers via a computer/browser interface, a phone application interface, text messaging, or email. The user interface module 10 can include a configuration management sub module 101, a data management sub module 102, a performance dashboard sub module 103, a dialog sub module 104, a restriction recording sub module 105, and a remote control sub module 106.

The configuration management sub module 101 can enable business staff to access, review, and update various parameters and configurations for each of the campaigns/communication rules. The configuration management sub module 101 can provide a capability to preview the communications that would result from each campaign/communication rule using test data as well as actual data associated with a business. Accordingly, the configuration management sub module 101 allows the business staff to adjust communications, such as text messaging, accordingly. The configuration management sub module 101 can allow access, review, and update inbound communication routing rules that affect how inbound communications (e.g., text messages, email, phone calls, web API calls, etc.) need to be routed. These rules are described in more detail in connection with an inbound message/communication routing sub module 504. The configuration management sub module 101 can also enable the business staff to administer and control various other configurations including user logins, access privileges, business locations/offices, phone numbers associated with business locations/offices, etc. In some embodiments, the configuration management sub module 101 can interface (or communicate) with sub modules of the persistence module 30, including the campaign/communication rules sub module 301, the business entity persistence sub module 302, and the access and privilege persistence sub module 303. In some embodiments, the configuration management sub module 101 also can interface with various sub modules of the campaign/communication rules module 20, including the configuration sub module 201 and the validation and preview sub module 202.

The data management sub module 102 can enable business staff to manage business data as well as multimedia content. Business data can include information regarding clients, prospects, transaction details, other contact lists, etc. Multimedia content can include pictures, audio and video clips, their names, descriptions, etc. to be used in communications. Management of business data can include uploading, downloading, previewing counts and values of business data, and searching through the business data. The data management sub module 102 can provide help and instructions to business staff about exporting the business data from various proprietary computer systems utilized by the business staff in running their respective business. In some embodiments, the data management sub module 102 can interface with sub modules of the persistence module 30, including the business entity persistence sub module 302 and the consumer info persistence sub module 304.

The performance dashboard sub module 103 can empower the business staff to see various performance metrics for desired time periods in various graphical formats, including charts, tables, etc. The performance dashboard sub module 103 can support analyzing the performance metrics from various angles including aggregate and overall views as well as detailed views at the level of individual business location/office. The performance dashboard sub module 103 can support creating custom views and reports by the business staff for their specific purposes. The performance dashboard sub module 103 can allow for exporting of the performance metrics for offline analysis in various tools like spreadsheet tools or statistical analysis tools. In some embodiments, the performance dashboard sub module 103 can interface with sub modules of the persistence module 40, including the reporting and analytics definition sub module 401 and the report and analytics production sub module 405.

The dialog sub module 104 can enable the business staff to review entire conversations of communications, such as text messages, sent to and received from each consumer. The dialog sub module 104 can enable review of conversations by various filtering criteria like date range, specific campaigns, specific consumers, delivery status of messages, direction of the messages (i.e., incoming or outgoing), etc. The dialog sub module 104 can enable review of complete conversation histories with any specific consumer going back in time to the very first message that was sent or received. The dialog sub module 104 can enable transmission of a communication, such as a text message, directly from a user interface. After transmission, the communication can appear on a computing device (e.g., mobile phone) of a consumer. The dialog sub module 104 can enable a real-time notification bubble if a communication, such as a text message, is received. The dialog sub module 104 can enable further review of a communication as well as preparation and transmission of a response back to the consumer. The dialog sub module 104 can display detailed consumer information automatically upon receiving an incoming call from an existing or known customer. For example, this information can appear as a dialog box and can be used by customer service and support staff of the business to carry out a more informative or detailed conversation with the consumer. The information contained in the dialog box may include the consumer's name or other relevant information from the data uploaded by the business staff through the data management sub module 102. The information contained in the dialog box can also include recent conversation history with the consumer along with an option to see more history. In some embodiments, the dialog sub module 104 can interface with sub modules of the persistence module 30, including the consumer info persistence sub module 304 and the message queue persistence sub module 306. The dialog sub module 104 also can interface with sub modules of the communication module 50, including the SMS interface sub module 505, the phone call interface sub module 506, the email interface sub module 507, and the inbound message/communication reception sub module 503.

The restriction recording sub module 105 can enable business staff to manage consumer contacts that have restrictions associated with them. For example, common restrictions include "do not text", "do not call", or "do not email". Other examples of restrictions may also include "landline" that can receive only a phone call but not a text message or a "pager" that can receive only a text message. Some of these restrictions may be permanent. For example, a landline number will not accept a text message. Other restrictions may be temporary. For example, there may be a need to "pause" all communication with a particular consumer but only for a period of time. The restriction recording sub module 105 can allow business staff to add, remove, and change restrictions associated with certain consumers. The restriction recording sub module 105 can interface with sub modules of the persistence module 30, including the consumer info persistence sub module 304 and the restrictions persistence sub module 305.

The remote control sub module 106 can enable business staff to control certain aspects of the system 5 without using a web interface but rather using SMS text messages, phone calls, or email. The aspects of the system 5 that can be controlled in this manner may include management of restrictions which also can be performed by the restriction recording sub module 105. Other aspects that can be controlled may also include creating a new text message blast campaign and executing it directly through text messages or voice commands. Further details regarding blast campaigns are provided herein in connection with the description of the configuration sub module 201 of the campaign/communication rules module 20. The remote control sub module 106 can interface with the restriction recording sub module 105 as well as sub modules of the communication module 50, including the SMS interface sub module 505, the phone call interface sub module 506, the email interface sub module 507, and the web interface sub module 508.

Figure 4:
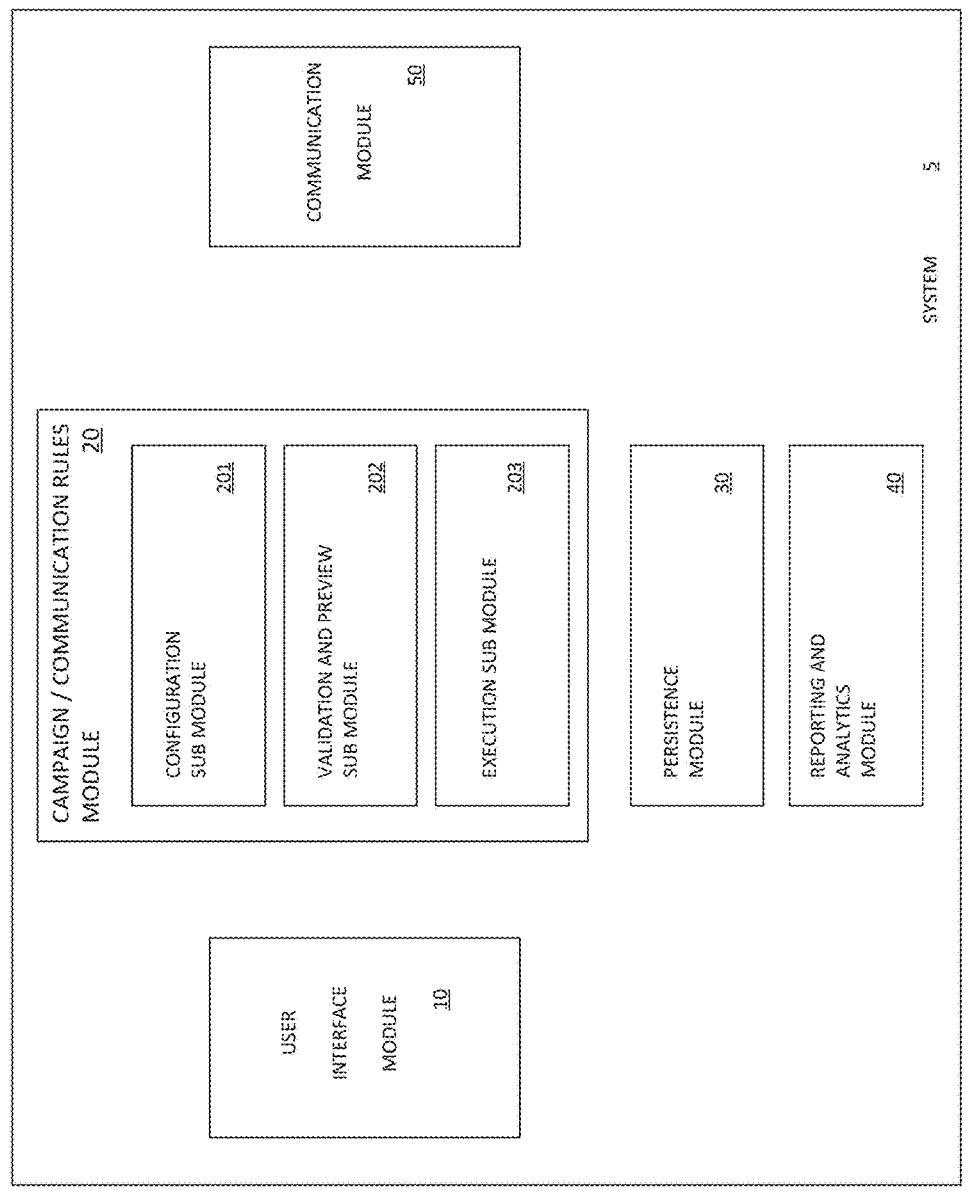
FIG. 4 illustrates an example campaign/communication rules module, according to an embodiment of the present technology.

FIG. 4 illustrates an example of the campaign/communication rules module 20, according to an embodiment of the present technology. The campaign/communication rules module 20 can initiate conversations with consumers in accordance with the present technology. The campaign/communication rules module 20 can manage campaigns/communication rules (or rule or ruleset) reflecting various industry best practices as a default set as well as allows business staff to modify these default campaigns/communication rules or create new ones. The campaign/communication rules module 20 can manage detailed configurations and parameters for all campaign/communication rules. The campaign/communication rules module 20 can validate the configurations for each campaign/communication rule as well as provide sample "preview" results for the business staff to help them with configuration tasks. The campaign/communication rules module 20 can manage active/inactive status for each campaign/communication rule. The campaign/communication rules module 20 can execute the active campaign/communication rules resulting in initiation of automated communication with the consumers. The campaign/communication rules module 20 can include a configuration sub module 201, a validation and preview sub module 202, and an execution sub module 203.

The configuration sub module 201 of campaign/communication rules module 20 can identify and provide various configuration parameters associated marketing campaigns or communication rules (or campaign/communication rules). The configuration parameters are inputs to the campaign/communication rules, based on which the rules can decide who to send a message to, when to do it, and what the message should be. The campaign/communication rules can be a default set reflecting industry best practices or custom created by the business staff. A campaign/communication rule can reflect or describe various aspects of industry best practices. Such best practices can be supported by businesses and their staff. As an example, a best practice can initiate a one-on-one conversation between a business and a consumer. An example of a campaign/communication rule is a "Prior Year Client Reminder" in the income tax preparation industry. This refers to a best practice where income tax preparation offices invite customers from one or more prior years during the tax season each year from January through April. In this example of "Prior Year Client Reminder" campaign/communication rule, the configuration parameters may include a) number of years to go back to for reminding customers (default could be two years), b) maximum number of reminders to be sent to each customer (default could be three reminders), c) for each reminder, number of days in advance the reminder must be sent relative to the prior year visit date, that is, the calendar date the customer came in to prepare his/her tax return the last time. For example, consider two customers—customer X came on February 25 of last year and competed the tax return and customer Y came on February 25 of three years ago but hasn't come since then. A "Prior Year Client Reminder" campaign/communication rule may have configuration parameter of a) number of years to go back to =2 years, b) maximum number of reminders to each customer=3 reminders and c) number of days in advance of the prior visit date of 21, 10 and 3. The "Prior Year Client Reminder" campaign/communication rule will not create any messages for customer Y because his/her last visit was longer than 2 years ago (configuration parameter a. number of years to go back to). Secondly for customer X, three messages will be generated, one each on the following dates of the current year—February 4, February 15 and February 22. This is assuming customer X has not visited the business by February 22 already, otherwise the campaign/communication rule (or ruleset) will cease to send customer x further reminders and customer X may become eligible to receive messages under a different campaign/communication rule, for example, "Referral Request". This part is the fixed part of the rule that is not affected by the configuration parameter. Although the example marketing campaign or communication rule is described in relation to the income tax preparation industry for ease of illustration, the present technology can be applied to any campaign/communication rule associated with a best practice in any industry apart from the individual tax preparation industry.

A campaign/communication rule can include triggering rules, a message/communication template, and a delivery time window. In some embodiments, a triggering rule can relate to a determination of an occurrence of events or conditions that prompts transmission of a communication, such as a text message, to a consumer. With respect to the example relating to the income tax preparation industry, a triggering rule can decide which client from prior year(s) needs to be reminded to visit the office of a business and complete a tax return in the current year depending upon the current date and time and the client's behavior from past years. For example, when deciding who should receive a communication from the business on a given day, such as the current date, if the current date and time is within the early part of the tax season (e.g., mid-January), the triggering rule can indicate that all clients from prior years who have not already come to the office and started their tax returns and who have shown a tendency in the past for coming to the office mid-January to mid-February should be sent a communication in the form of a reminder.

Another example of a triggering rule can be based on any one or more of the following considerations: the timeliness of payment and history of requesting discounts by clients in prior years; the number of calendar days elapsed from start to finish in preparing a tax return, which can reflect the nature of a client's documentation and organizational habits and attendant burden on the business in completing her tax return; the number of hours and minutes actually spent by business staff working on the client's tax return, reflecting complexity of the work; the number of customer service calls and visits to the office and effort and time invested by the business staff during each call and visit; the profitability of the client, which can be a comparison of payment received versus time and effort invested in preparing the tax return during the tax season and customer service throughout the year; and the desirability of the client from the perspective of the business and related desire to initiate a bidirectional dialog in accordance with the present technology. Many variations are possible.

A message/communication template can contain the text or audio of the communication to be delivered. The template may contain multimedia elements, such as a picture, an image, a video clip, etc. The template also can contain place holders that are to be replaced by information to make the communication relevant and tailored for the particular recipient. The information can include, for example, the recipient's name, a name of a business staff member as sender of the communication, etc.

A delivery time window can enable transmission of the communication to be timely. The delivery time window can be a window of time in a number of days within the firing or satisfaction of the triggering rule during which a communication must be sent to be timely. In accordance with the present technology, the delivery time window can also include a time of day window during which the communication must be delivered to be received conveniently or timely. In contrast, in accordance with many conventional techniques, all communications are sent to all consumers at the exact same time of the day, and actual time of receipt is dictated by the congestion in the delivery channels. A primary problem with these conventional techniques is that the timing of final message delivery is unpredictable, thus reducing effectiveness of the communication.

Another example of a campaign/communication rule is a text blast. The configuration sub module 201 can support text blasts. A text blast allows for a batch oriented transmission of text messages (or other types of communications) from a business entity to a group of consumers during a relatively short period of time. The text messages are personalized and relevant for the consumers receiving them. Moreover, the consumers can respond to the text messages via text messages (e.g., SMS text messages) as well as phone calls in a manner described herein. The configuration sub module 201 can store the values provided by the business staff of each configuration parameter for each campaign/communication rule. The configuration sub module 201 can activate and deactivate each campaign/communication rule. The configuration sub module 201 can interface with the validation and preview sub module 202. The configuration sub module 201 can also interface with the configuration management sub module 101 of the user interface module 10. The configuration sub module 201 can also interface with the campaign/communication rules persistence sub module 301 of the persistence module 30.

The validation and preview sub module 202 can validate the values of various configuration parameters associated with each campaign/communication rule. The validation and preview sub module 202 can create previews of the resulting communication for each campaign/communication rule using the specified values for the configuration parameters. The validation and preview sub module 202 can interface with various sub modules of the persistence module 30, including the campaign/communication rules persistence sub module 301, the business entity persistence sub module 302, and the consumer info persistence sub module 304. The validation and preview sub module 202 can also interface with the configuration management sub module 101 of the user interface module 10.

The execution sub module 203 can evaluate and execute each campaign/communication rule for all business entities supported by the system 5. The execution can be based on a predetermined time schedule or it can be triggered by system events and requests from the business staff. The execution sub module 203 can apply the campaign/communication rule along with their associated values for all configuration parameters onto available data for each consumer. The result is identification of the consumers that match one or more specific campaign/communication rules and hence are candidates for receiving a communication. The execution sub module 203 can apply various steps to further qualify candidate consumers to receive a communication, as described in more detail herein. The execution sub module 203 can create the intended communication for each candidate by replacing placeholder variables in a communication template with values associated with the consumer as well as the business entity. The execution sub module 203 can store the outbound communication in a message queue to be picked up by the communication module 50 for delivery. The execution sub module 203 can interface with various sub modules of the persistence module 30, including the campaign/communication rules persistence sub module 301, the business entity persistence sub module 302, the consumer info persistence sub module 304, the restrictions persistence sub module 305, and the message queue persistence sub module 306.

Figure 5:
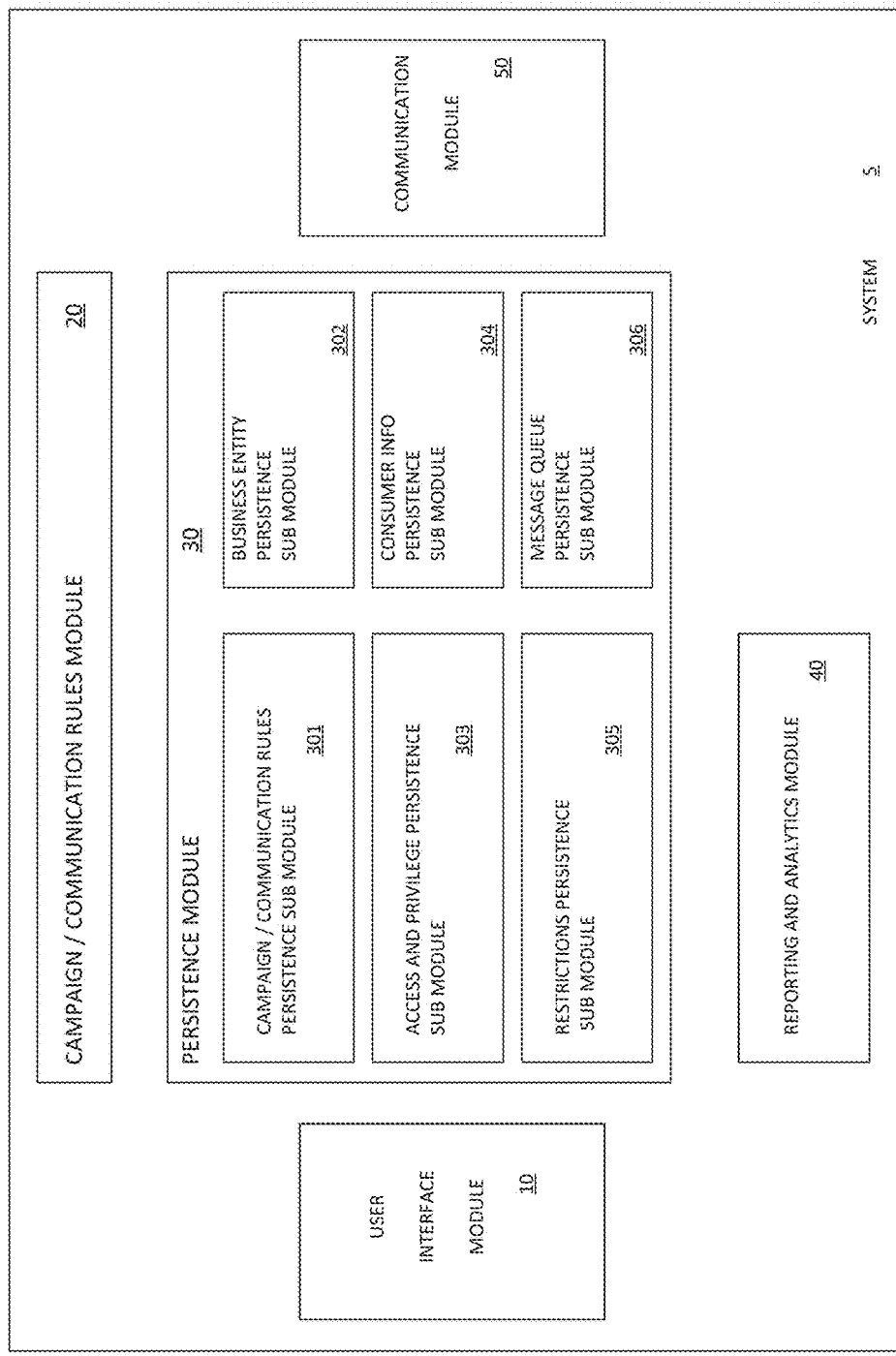
FIG. 5 illustrates an example persistence module, according to an embodiment of the present technology.

FIG. 5 illustrates an example of the persistence module 30, according to an embodiment of the present technology. The persistence module 30 can act as the operational data storage and persistence hub supporting all other modules. The persistence module 30 can persist campaign/communication rules and the values of their associated configuration parameters for each business entity supported by the system 5. The persistence module 30 can store information about businesses entities as well as consumers. The persistence module 30 can maintain detailed access privileges that are enforced by the user interface module 10. The persistence module 30 can persist the various restrictions associated with consumer contacts. The persistence module 30 can persist outbound communications as well as inbound communications. In some embodiments, the persistence module 30 can interface with all modules and their respective sub modules of the system 5. In some embodiments, the persistence module 30 does not interface with the reporting and analytics module 40, which can have an additional separate storage in the data warehouse which contains reporting and analytics data optimized for read-only access. The persistence module 30 can include a campaign/communication rules persistence sub module 301, a business entity persistence sub module 302, an access and privilege persistence sub module 303, a consumer info persistence sub module 304, a restrictions persistence sub module 305, and a message queue persistence sub module 306.

The campaign/communication rules persistence sub module 301 can persist default industry best practice campaigns/communication rules as well as custom created or modified campaigns/communication rules designed by the business staff. The campaign/communication rules persistence sub module 301 can persist the values for all configuration parameters for each campaigns/communication rule associated with each business entity supported by the system 5. The campaign/communication rules persistence sub module 301 can persist active/inactive statuses for each campaign/communication rule for each business entity.

The business entity persistence sub module 302 can persist detailed information for each business entity supported by the system 5. The information persisted by the business entity persistence sub module 302 can include information about various locations/offices, associated staff members, phone numbers used to send out text messages and phone calls for each location, phone numbers to forward the incoming text messages from consumers as well as incoming phone calls.

The access and privilege persistence sub module 303 can persist various user roles of business staff and associated access privileges. The user roles can allow and restrict access to various user interface elements, including menu items, tabs as well as nonuser interface elements like APIs (application programming interfaces). The access and privilege persistence sub module 303 can persist assigned roles to each user among the business staff.

The consumer info persistence sub module 304 can persist consumer information for all business entities supported by the system 5. The consumer information can include but is not limited to names, phone numbers, email addresses, postal addresses, transaction history with the business, and information about other individuals associated with the consumer (e.g., friends, family members, dates of birth, contact information, etc.). The consumer information persisted by the consumer info persistence sub module 304 can come from a variety of sources. For example, a first source can be data uploaded by the business staff using the data management sub module 102. As another example, a second source can be based on analysis of conversations with the consumer over the course of time that the consumer and business engage in conversations through the system 5.

The restrictions persistence sub module 305 can persist the various restrictions associated with consumer contacts. The nature of these restrictions is described in more detail herein in connection with the restriction recording sub module 105. The sources of the information persisted by the restrictions persistence sub module 305 can include the business entity, information from conversations between the business entity and the consumer, as well as third party sources such as the Do Not Call Registry of the Federal Trade Commission.

The message queue persistence sub module 306 can persist outbound communications as well as inbound communications for each consumer of each business entity supported by the system 5. The communications can be of various kinds, including communications that were delivered, communications that resulted in an error of various types, or communications scheduled for future delivery.

Figure 6:
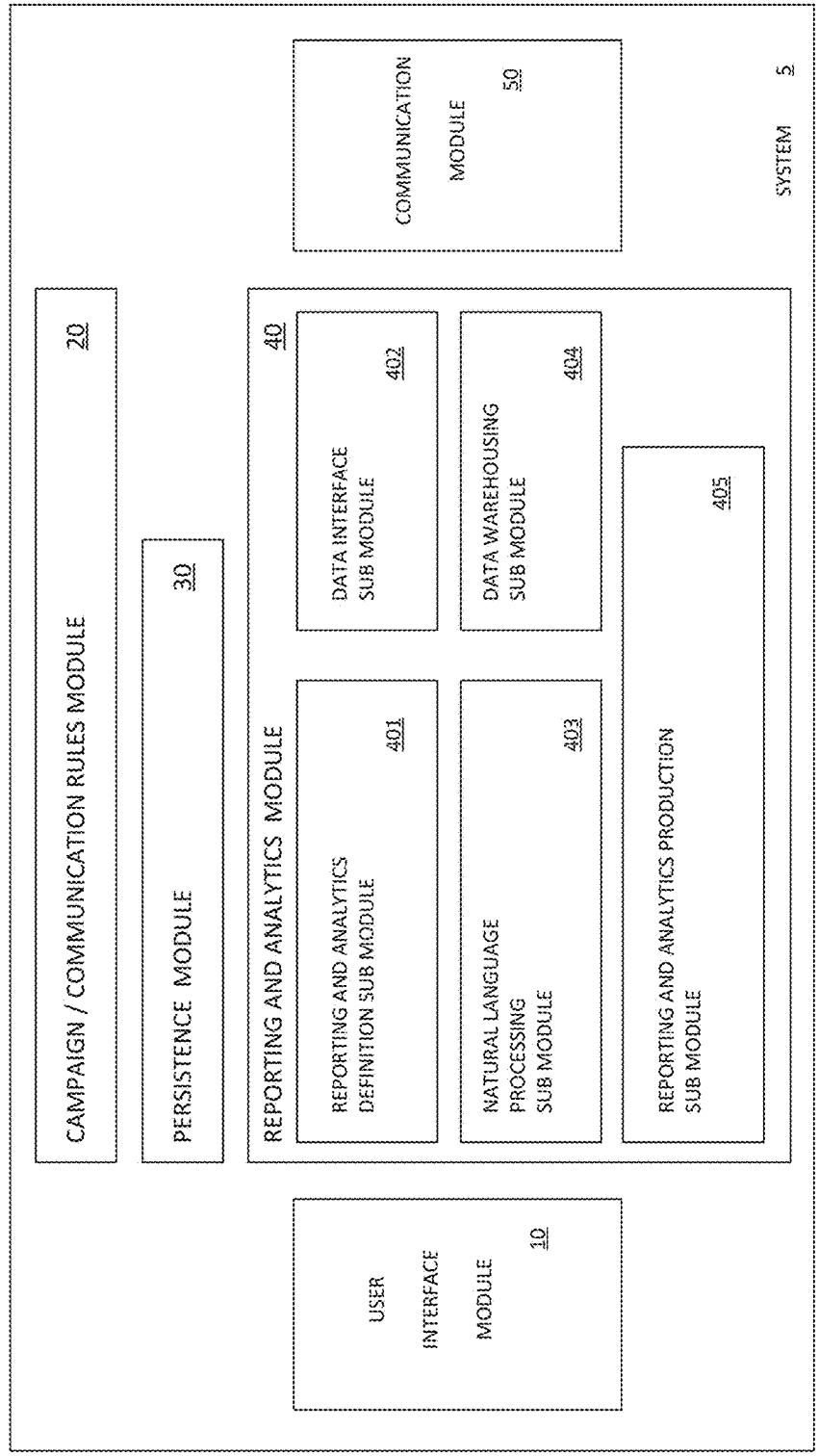
FIG. 6 illustrates an example reporting and analytics module, according to an embodiment of the present technology.

FIG. 6 illustrates an example of the reporting and analytics module 40, according to an embodiment of the present technology. The reporting and analytics module 40 can provide views and insights relating to performance of the system 5. The reporting and analytics module 40 can support various functions of the performance dashboard sub module 103 of user interface module 10. The reporting and analytics module 40 can maintain a data warehouse to persist the detailed information needed for high volume data access and fast read-only access. The reporting and analytics module 40 can analyze the nature of each communication in conversations between businesses and consumers to infer sentiment as well as concepts that are important to consumers. The reporting and analytics module 40 can include a reporting and analytics definition sub module 401, a data interface sub module 402, a natural language processing sub module 403, a data warehousing sub module 404, and a reporting and analytics production sub module 405.

The reporting and analytics definition sub module 401 can enable business users to create a new report or modify an existing report to better suit their needs. The reporting and analytics definition sub module 401 can store the definition of reports and associated meta data.

The data interface sub module 402 can act as a data connection bus that brings the operational data from the persistence module 30 into the data warehousing sub module 404 of the reporting and analytics module 40. The data interface sub module 402 can transform the operational data into a format suited for the data warehousing sub module 404. The data interface sub module 402 can keep the data in the data warehousing sub module 404 up to date by periodically bringing incremental operational data from the persistence module 30.

The natural language processing sub module 403 can apply natural language processing (NLP) techniques to analyze the nature of each communication in a conversation to infer sentiment as well as concepts that are important to consumers. The communication can be textual (e.g., SMS text message, email, etc.) as well as voice (e.g., phone conversation). For voice conversations, natural language processing can be applied after text-to-speech conversion. Various third party solutions for natural language processing are available, including Stanford University's core NLP and senticnet (sentic.net). Some of these solutions are open source while others are proprietary solutions available for a license fee.

The natural language processing sub module 403 can provide the sentiments and concepts extracted from each conversation to the data warehousing sub module 404 for aggregation. This results in availability of insight into the overall sentiment and relevant concepts that are important to a consumer or a group of consumers of a business entity. Information relating to the insights and the concepts can be used by the system 5 in a variety of ways. One example can be to apply restrictions to contacts with a consumer. For example, a "do not text" restriction can be temporarily or permanently used if the sentiment identified in response communications is negative. As another example, the transmission of outbound text messages in a text blast for a business entity can be slowed down or terminated, in real time, if a negative sentiment is identified in a threshold number of response communications received from the consumers.

The data warehousing sub module 404 can receive operation data from the modules of the system 5 through the data interface sub module 402. The data warehousing sub module 404 can store data in a format that makes it easy for consumption by the reporting and analytics definition sub module 401 and the reporting and analytics production sub module 405. The data warehousing sub module 404 can aggregate data along various dimensions to enable analyses as described herein in connection with the performance dashboard sub module 103.

The reporting and analytics production sub module 405 can execute various reports and analytics by applying their definition onto the data from the data warehousing sub module 404. The reporting and analytics production sub module 405 can make the resulting reports available for the business staff to consume via the performance dashboard sub module 103 of the user interface module 10.

Figure 7:
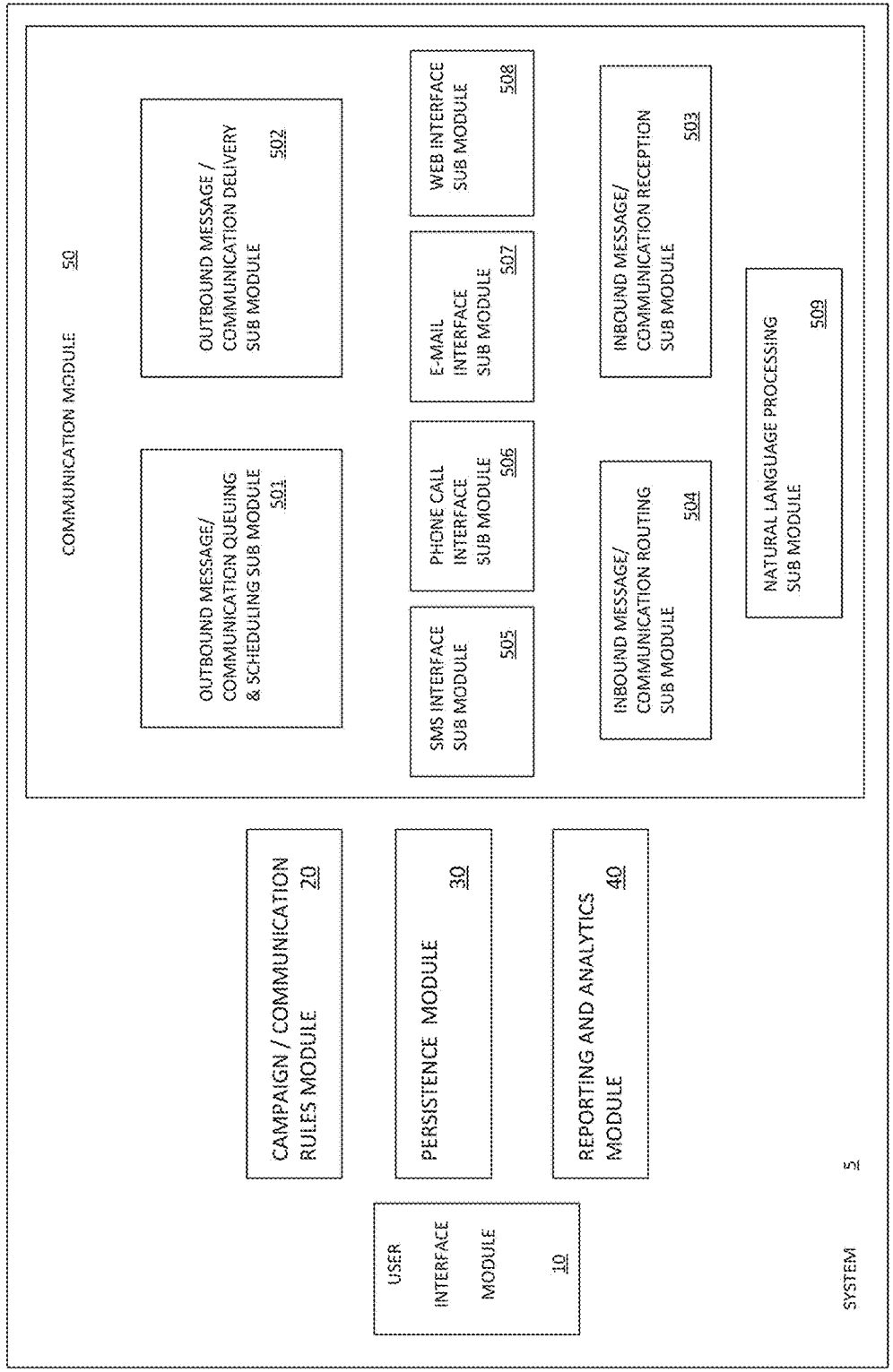
FIG. 7 illustrates an example communication module, according to an embodiment of the present technology.

FIG. 7 illustrates an example of the communication module 50, according to an embodiment of the present technology. The communication module 50 can carry out the actual communication to and from the consumers through various communication channels. The communication module 50 can deliver communications from the system 5 to the consumer on behalf of business staff. The communication module 50 can deliver response communications back from the consumer to the business staff. The communication module 50 can decide optimal routing for all the incoming communications from the consumers. The communication module 50 can enable slowing down or speeding up of the delivery rate for the communications for a business based on the sentiments and concepts inferred from the consumer responses through natural language processing. The communication module 50 can include an outbound message/communication queuing and scheduling sub module 501, an outbound message/communication delivery sub module 502 outbound message/communication delivery sub module 502, an SMS interface sub module 505, a phone call interface sub module 506, an email interface sub module 507, a web interface sub module 508, an inbound message/communication reception sub module 503, an inbound message/communication routing sub module 504, an inbound message/communication reception sub module 503, and a natural language processing sub module 509.

The outbound message/communication queuing and scheduling sub module 501 can decide delivery schedules for outbound communications to consumers on behalf of each business entity. The outbound message/communication queuing and scheduling sub module 501 can interface with the message queue persistence sub module 306 of the persistence module 30 in order to access outbound messages to be scheduled. The outbound message/communication queuing and scheduling sub module 501 can also interface with the natural language processing sub module 403 of the reporting and analytics module 40 to identify historic sentiment levels for a business entity as well as all consumers to whom outbound messages are addressed. The outbound message/communication queuing and scheduling sub module 501 can also interface with the natural language processing sub module 509 of the communication module 50 to achieve a real-time (or near real-time) sense of the sentiment of an individual as well as a group of consumers associated with each business entity. This enables the outbound message/communication queuing and scheduling sub module 501 to slow down the delivery schedule for text messages in a text blast for a business entity if a negative sentiment is identified in a threshold number of response messages received from the consumers in real-time.

The outbound message/communication delivery sub module 502 can select outbound messages to be delivered to the consumers per the schedule identified by the outbound message/communication queuing and scheduling sub module 501. The outbound message/communication delivery sub module 502 can also deliver communications to the business staff in some cases through remote control interaction scenario described herein in connection with the remote control sub module 106. The outbound message/communication delivery sub module 502 can select an appropriate delivery interface based on the communication channel and initiate delivery through one of the SMS interface sub module 505, the phone call interface sub module 506, the email interface sub module 507, and the web interface sub module 508. The outbound message/communication delivery sub module 502 can enable addition of new delivery interface sub modules to support other new channels desired by business staff or their consumers.

The SMS interface sub module 505 can handle delivery as well as reception of SMS/text messages to and from consumers as well as business staff.

The phone call interface sub module 506 can handle phone calls to consumers and business staff as well as reception of phone calls from consumers and business staff.

The email interface sub module 507 can handle delivery as well as reception of email messages to and from consumers as well as business staff.

The web interface sub module 508 can handle initiation as well as reception of web service API calls to and from third party web hooks or web endpoints. A variety of channels of communication can be potentially supported by the web interface sub module 508 by leveraging third party communication applications and services, including but not limited to push notification on mobile apps, messaging through popular messaging applications like Viber, Whatsapp, Skype, Facebook Messenger, Yahoo Messenger, etc., as well as messaging within proprietary corporate applications through APIs exposed by them.

The inbound message/communication reception sub module 503 can receive inbound communications from the consumers as well as business staff. In some embodiments, the receipt of such communications can be through remote control interaction described herein in connection with the remote control sub module 106. The inbound message/communication reception sub module 503 can provide consistent reception to channel specific interface sub modules to which incoming communications are handed over. The channel specific interface sub modules include the SMS interface sub module 505, the phone call interface sub module 506, the email interface sub module 507, and the web interface sub module 508. The inbound message/communication reception sub module 503 can enable addition of new interface sub modules to support new channels of communication.

The inbound message/communication routing sub module 504 can decide optimal routing for all incoming communications. The following are examples of such routing:

If a text message is received and identified to be coming from a consumer, it will be routed to the business entity associated with the phone number on which the text message was received.

If a text message is received and identified to be coming from a business staff, it can be a response intended for a consumer or it can contain a "remote control" command, for example, to add a restriction to a particular consumer's contact (as described herein in connection with the remote control sub module 106 of the user interface module 10).

If a phone call is received from a consumer and it is identified to be an existing customer for a business, it can be routed to a customer service phone number or call hunting group for the business while at the same time pushing important information about the customer and recent conversation history to be displayed by the dialog sub module 104 of the user interface module 10 (as described herein in connection with the description of dialog sub module 104 of the user interface module 10). In this scenario of the phone call from a consumer, if the consumer has demonstrated negative sentiment in other recent conversations, this call may automatically be forwarded to a supervisor at the business entity or a public relations manager.

If a phone call is received from a consumer and the caller ID phone number is identified to be a spammer or a telemarketing company's automated phone system, the phone call can be forwarded to a telephone PBX switch to prompt punching of dial pad keys to reach someone. This mechanism can be used to thwart unwanted telemarketing calls since the automated systems (or bots) responsible for such phone calls normally are unable to listen to a voice response and punch in a key according to the instruction.

If a phone call is received from a number not associated with a current customer, it may reflect a new prospect or sales opportunity and hence this phone call can be routed to a qualified sales rep without asking for any key stores or delays.

The natural language processing sub module 509 can analyze in real-time sentiment and concepts in the incoming communications from consumers. In some embodiments, the functionality of the natural language processing sub module 509 can be similar in nature to the functionality of the natural language processing sub module 403 of the reporting and analytics module 40. However, the natural language processing sub module 509 can operate in real-time as response messages come in from the consumers, as opposed to analyzing old response messages.

A first process flow is now described relating to execution of campaign/communication rules. The first process flow describes how the system 5 can execute the campaigns/communication rules using its modules and sub modules. Process steps of the first process flow are described in the order of their execution. The first process flow can be executed by the execution sub module 203 of the campaign/communication rules module 20 and also other sub modules. Supporting modules and sub modules that can execute portions of the first process flow in certain embodiments are mentioned in parenthesis for steps of the first process flow. The first process flow proceeds as follows:

In priority order of campaigns/communication rules, execute the following for each campaign/communication rule:

Load configuration parameters (the campaign/communication rules persistence sub module 301).

Construct consumer qualification criteria for the campaign/communication rule. The qualification criteria are filters or queries to select candidate consumers who should receive a message/communication.

Execute consumer qualification criteria to identify list of qualifying candidate consumer records (the consumer info persistence sub module 304).

Loop 1: For each candidate client record:
  Identify consumer communication and messaging channel channel(s) (example: SMS, phone call, email, etc.) (the consumer info persistence sub module 304).
  Loop 2: for each communication and messaging channel:
    Load message/communication template (the campaign/communication rules persistence sub module 301).
    Check if restrictions apply for the current messaging channel (the restrictions persistence sub module 305). If yes, go to next communication/message channel in Loop 2.
    Verify against "cadence control" for current communication and messaging option. The cadence control can be a desired maximum number of messages/communication through a communication channel during a specified period of time (the message queue persistence sub module 306).
    If desired cadence control for current time period already achieved, go to next qualifying consumer in Loop 1.
    Personalize message by replacing placeholders in message/communication template using values from consumer's data record as well as business entity's data record (the campaign/communication rules persistence sub module 301 and the consumer info persistence sub module 304).
    Create and store communication/message (the message queue persistence sub module 306).
    Assign scheduled delivery date/time to the communication/message (the outbound message/communication queuing and scheduling sub module 501).

Figure 8A:
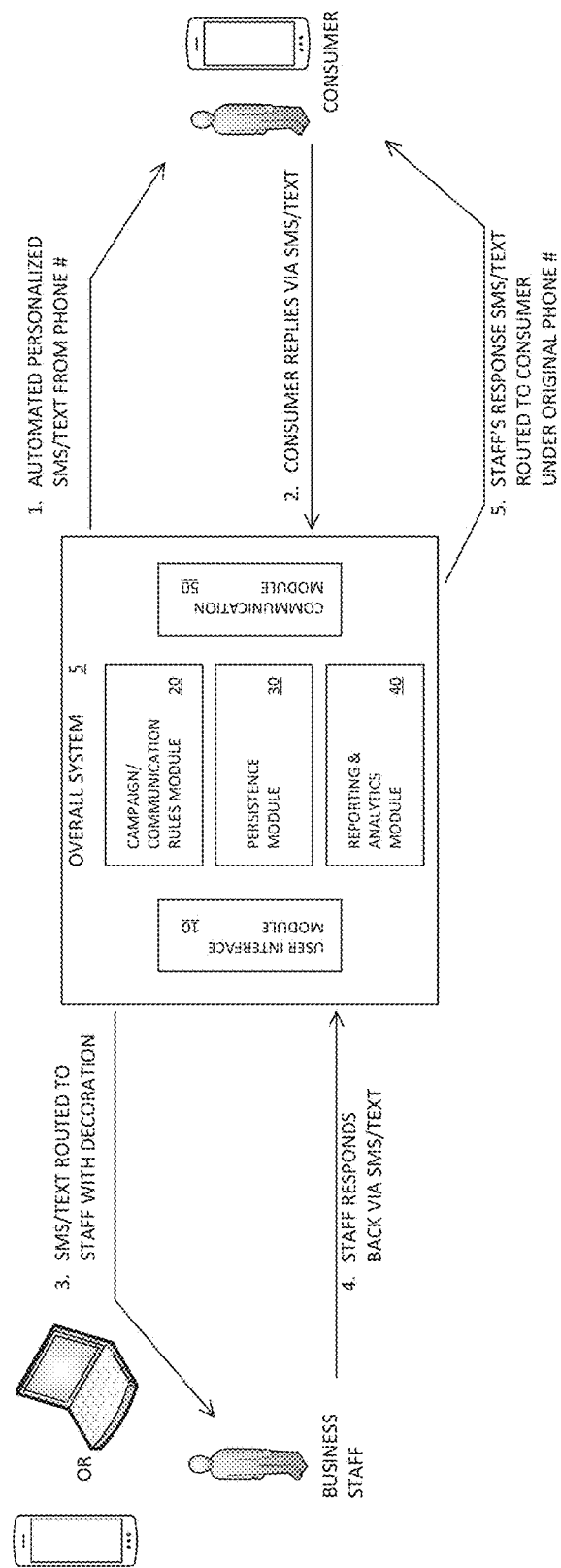
FIGS. 8A-8C illustrate a first example scenario, according to an embodiment of the present technology.
Figure 8B:
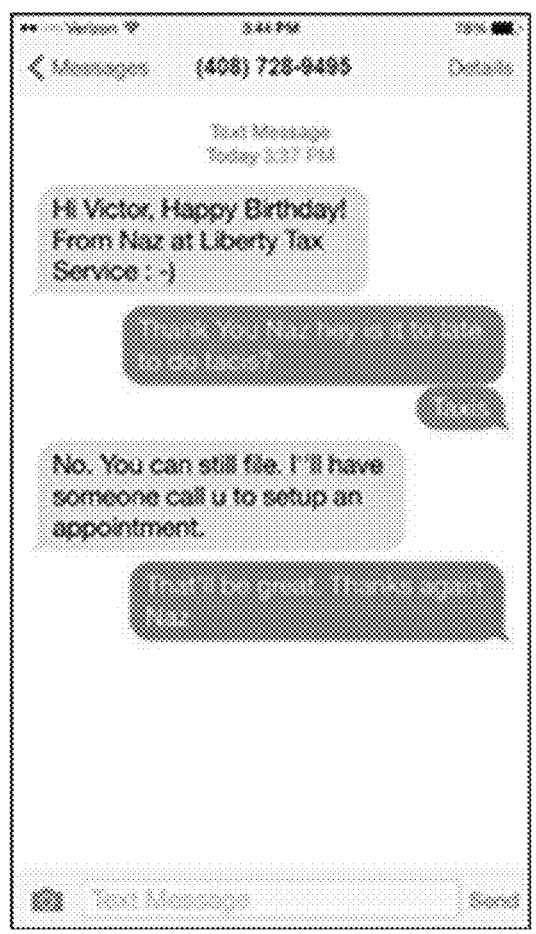
Figure 8C:
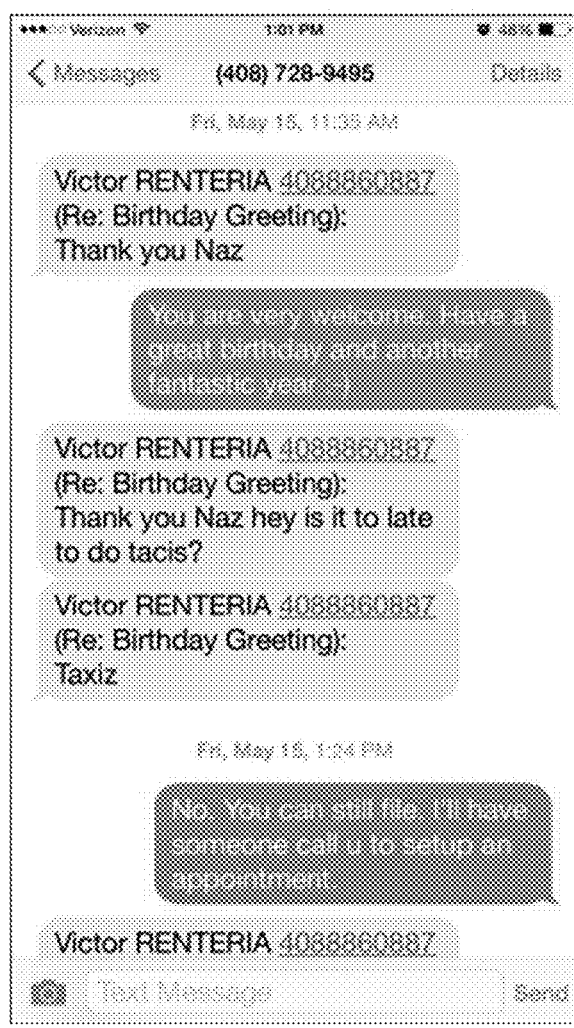

FIG. 8A illustrates an example scenario involving a human-to-human SMS/text conversation, according to an embodiment of the present technology. The scenario relates to a hybrid approach of the present technology that is part automated and part manual. As shown, the scenario describes a two-way SMS/text conversation between a consumer and a business staff. A screen 82 of a mobile phone of a user that presents the conversation as seen by the consumer is shown in FIG. 8B. From the consumer's viewpoint, the entire conversation is human-to-human, personalized and relevant, similar to a text conversation the consumer could have with a friend or a family member. A screen 84 of a mobile phone of a business staff in communication with the consumer as seen by the business staff is shown in FIG. 8C.

The first step ("1. Automated Personalized SMS/Text From Phone #"), as labeled in FIG. 8A, is a text message generated as a result of the first process flow as described in more detail herein. This text message comes to the consumer from a regular phone number. As shown in FIG. 8B, the regular phone number is "(408) 728-9495". The text message does not include or display a short code.

The second step ("2. Consumer Replies Via SMS/Text") is that the consumer replies via an SMS/text message. As shown in FIGS. 8B and 8C, the consumer made a typo and immediately sends another text message, which contains another typo. Both of these text messages are reflected in the step 2.

The consumer's reply text messages are routed through the system 5 back to the mobile phone of the business staff in step 3 ("3. SMS/Text Routed To Staff With Decoration").

The business staff reads the incoming text message from the consumer and types a reply text message and sends it. This reply from business staff is shown as step 4 ("4. Staff Responds Back Via SMS/Text"). This reply is routed through the system 5 back to the consumer in step 5 ("5. Staff's Response SMS/Text Routed to Consumer Under Original Phone #"). In step 5, the text message of the business staff is sent to the consumer under the same phone number from which the first automated text was sent in step 1. This reinforces the idea of human-to-human conversation to the consumer. Moreover, the privacy of the business staff is also protected because the mobile phone number of the business staff used to reply is not shared with the consumer.

The back and forth routing described herein is achieved through a process flow that is executed by the system 5 upon receiving any incoming message. This process flow is described below in connection with a second process flow.

The present technology as illustrated in the scenario of FIG. 8A provides many advantages. As just one example, the mobile phone used by the business staff may receive text messages from all consumers of a location/office associated with the business entity. In order to protect the privacy of the business staff in relation to the phone number of the business staff, the text messages from consumers are forwarded to the mobile phone of the business staff under the same phone number from which the consumer received the text message, in this example "(408) 728-9495" as shown in FIG. 8B. If the text messages from consumers are not forwarded to the mobile phone of the business staff in this manner, and the phone number of a consumer appears on the caller ID of the mobile phone of the business staff, then the reply of the business staff undesirably will go directly to the consumer without going through the system 5, thereby revealing the mobile phone number of the business staff to the consumer.

Another example of an advantage provided by the present technology relates to optimal organization of text messages for business staff. A mobile phone of a business staff can be cluttered with dozens if not hundreds of different text conversations or threads. The present technology allows the mobile phone of the business staff to collect all consumer conversations for the business location in the same thread. In some embodiments, identifying information of a consumer can be inserted into a communication, such as a text message, from the consumer to allow a business staff to conveniently find desired text messages or conversations associated with a consumer. For instance, a relevant conversation can be conveniently found by a business staff based on the insertion and appearance of a name (e.g., "Victor Renteria") and a phone number (e.g., "4088860887") of a consumer in the body of a text message from the consumer, as shown in FIG. 8C.

In some instances, two or more text messages from different consumers can arrive on a mobile phone of the business staff. The text messages from the different consumers can appear in the same thread. If the business staff replies back in this thread, the system 5 can decide which consumer should receive the response. In this regard, the responsive text message from the business staff will be directed to the phone number from which the mobile phone of the business staff received the last text message. To address the text message to any other consumer, the business staff can include the phone number of the intended consumer as a first part of the body of the text message. Accordingly, when a text message is received by the system 5 from a mobile phone of the business staff and when the body of the text message contains a phone number at the beginning, the text message is routed to the phone number at the beginning associated with the intended consumer. The second process flow described below illustrates this approach in the context of the overall routing of an incoming text message.

A second process flow is now described relating to routing of an incoming SMS/text message. The second process flow describes how the system 5 routes incoming SMS/text messages from consumers as well as business staff to an intended recipient in a manner that realizes the human-to-human conversation preferences described herein. The second process flow proceeds as follows:

Receive incoming SMS/text message on (directed to) a phone number (referred to as "phone number A") from another phone number (referred to as "phone number B") (the SMS interface sub module 505 and the inbound message/communication reception sub module 503).

Make an entry in the inbound messages/communications data store (the message queue persistence sub module 306).

Identify which business entity E is associated with phone number A (e.g., "business entity E") (the inbound message/communication routing sub module 504).

Identify which location/office of business entity E is associated with phone number A (e.g., "office O") (the inbound message/communication routing sub module 504).

Identify if phone number B belongs to a business staff member for office O (the inbound message/communication routing sub module 504).

If no:
This is an SMS/text message coming from non-staff (e.g., consumer) intended for business staff of business entity E.
Load intended SMS/text message recipient staff phone number P for office O (the business entity persistence sub module 302).
Load consumer information corresponding to phone number B for business entity E (the consumer info persistence sub module 304).
Is the consumer found?
If yes:
Prefix consumer name and phone number B to the incoming SMS/text message and create a new SMS/text message ("referred to as SMS/text message S") (the inbound message/communication routing sub module 504).

Route the newly created SMS/text message S to phone number P (the outbound message/communication queuing and scheduling sub module 501, the outbound message/communication delivery sub module 502, and the SMS interface sub module 505).
If no:
Prefix phone number B to the incoming SMS/text message and create a new SMS/text message S.
Route the newly created SMS/text message S to phone number P.
If yes:
This is an SMS/text message coming from a business staff intended for non-staff (e.g., consumer) of business entity E.
Parse incoming SMS/text message to see if there is a phone number at the beginning of the SMS/text message body. Is a phone number at the beginning of the SMS/text message body found?
If yes:
This is an SMS/text message coming from a staff member intended for the parsed phone number.
Construct a phone number (referred to as "phone number C") from the parsed text.
Remove phone number portion from the SMS/text message body and create a new SMS/text message (referred to as "SMS/text message T")
Deliver the new SMS/text message T from phone number A to phone number C.
If no:
This is an SMS/text message coming from business staff intended for consumer who sent in the last SMS/text message to phone number A.
Look up the last non-staff phone number (referred to as "phone number D") received on phone number A.
Deliver the incoming SMS/text message from phone number A to phone number D.

In some embodiments, the business staff may also use a computer screen to receive and reply to consumer text messages in addition to or as an alternative to a screen of a mobile phone, as shown in FIG. 8A.

Figure 9:
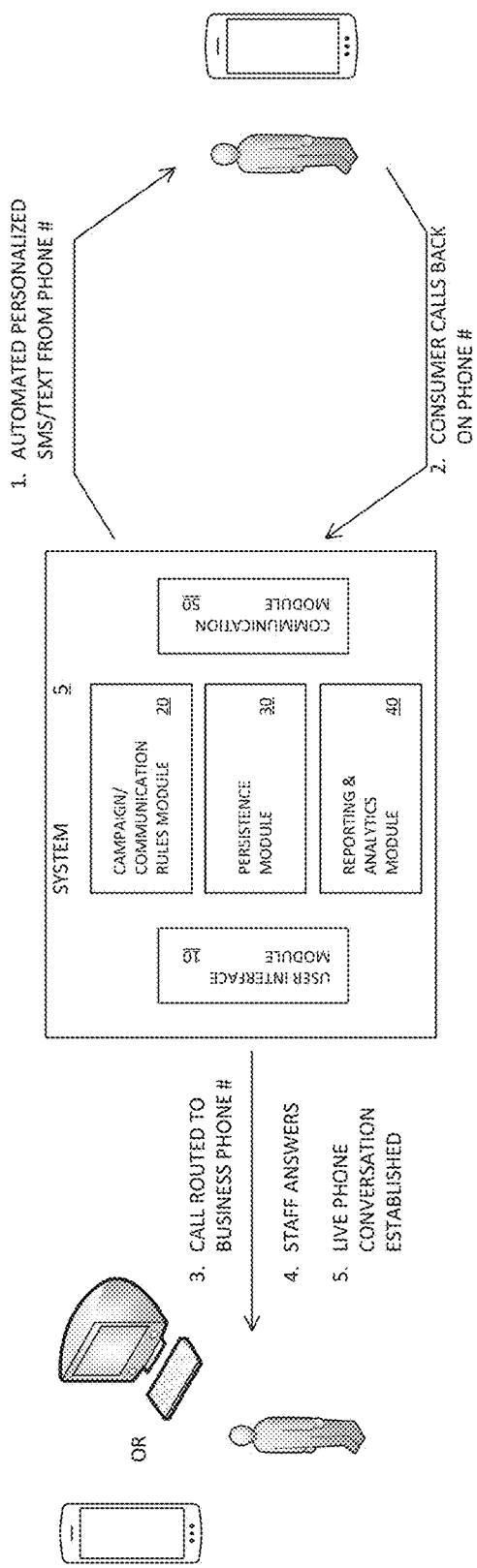
FIG. 9 illustrates a second example scenario, according to an embodiment of the present technology.

FIG. 9 illustrates an example scenario involving a human-to-human phone conversation between a consumer and a business staff based on an automated SMS/text message, according to an embodiment of the present technology. In step 1 ("1. Automated Personalized SMS/Text From Phone #"), as labeled in FIG. 9, a text message from a phone number that is associated with a business entity is received by the consumer. In step 2 ("2. Consumer Calls Back on Phone #"), a phone call is initiated by the consumer by dialing the phone number from which she received the text message. In step 3 ("3. Call Routed to Business Phone #"), the system 5 routes the phone call to a predesignated phone number associated with the office location of the business entity on whose behalf the original text message was generated in step 1. In step 4 ("4. Staff Answers"), a business staff of the business entity answers the phone call. In step 5 ("5. Live Phone Conversation Established"), a regular phone conversation is established between the business staff and the consumer based on the answering of the phone call.

The scenario illustrated in FIG. 9 reinforces to the consumer that her interactions with the business entity are human-to-human interactions. The system 5 remains invisible to the consumer. As described below, a third process flow describes how these interactions are achieved. In some embodiments, the business staff may use a regular phone line or a Voice Over IP (VOIP) phone service (with a physical phone instrument or an application on the computer or a smart phone) or even a WebRTC-based approach through a browser. WebRTC (Web Real-Time Communication) is an API definition drafted by the World Wide Web Consortium (W3C) that supports browser-to-browser applications for voice calling, video chat, and P2P file sharing without the need for internal or external plugins.

A third process flow is now described relating to routing of an incoming phone call. The third process flow describes how the system 5 routes incoming phone calls from consumers to appropriate business staff in a manner that realizes the human-to-human conversation preferences described herein. The third process flow proceeds as follows:

Receive incoming phone call on a phone number (referred to as "phone number A") from another phone number (referred to as "phone number B") (the phone call interface sub module 506 and the inbound message/communication reception sub module 503).

Make an entry in the inbound messages/communications data store (the message queue persistence sub module 306).

Identify which business entity is associated with phone number A (e.g., "business entity E") (the inbound message/communication routing sub module 504).

Identify which office location of business entity E is associated with phone number A (e.g., "office O") (the inbound message/communication routing sub module 504).

Load intended business staff's phone number P for office O (the business entity persistence sub module 302).

Load consumer information corresponding to phone number B for entity E (the consumer info persistence sub module 304).

Consumer found?
If yes:
   Generate text to speech audio recording of consumer name (the inbound message/communication routing sub module 504).
   Forward the incoming phone call to phone number P (the outbound message/communication queuing & scheduling sub module 501 and the phone call interface sub module 506).
   Call answered by business staff?
     If yes:
       First play the audio recording of the consumer name and then open up (establish) communication line for consumer to speak with staff (the phone call interface sub module 506).
     If no: (call goes to voicemail)
       First play the audio recording of the consumer name and then open up communication line to allow the consumer to listen to voicemail greeting and record consumer's message (the phone call interface sub module 506).
If no: (consumer not found)
   Forward the incoming phone call to phone number P (the outbound message/communication queuing & scheduling sub module 501 and the phone call interface sub module 506).

Figure 10:
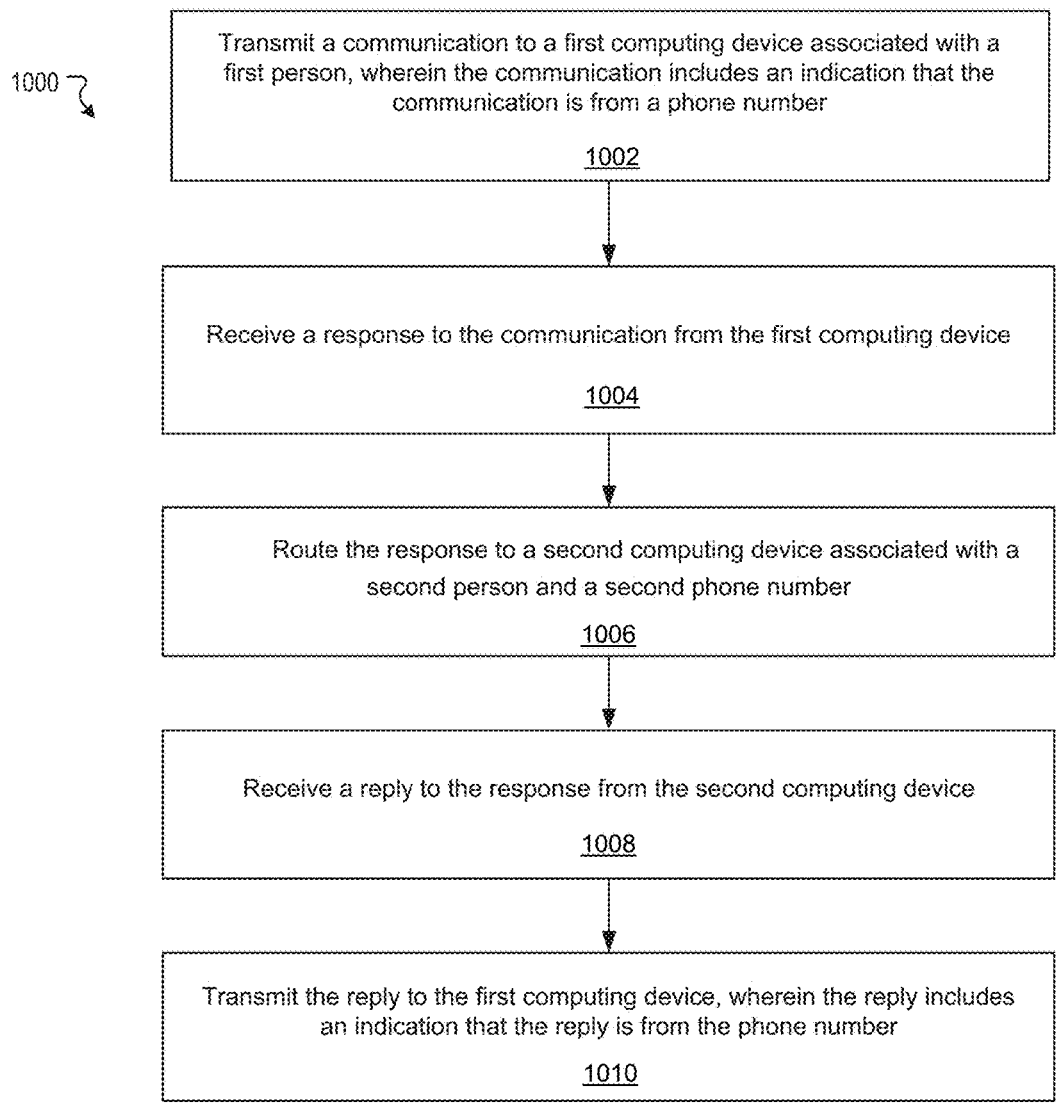
FIG. 10 illustrates an example method, according to an embodiment of the present technology
Figure 11:
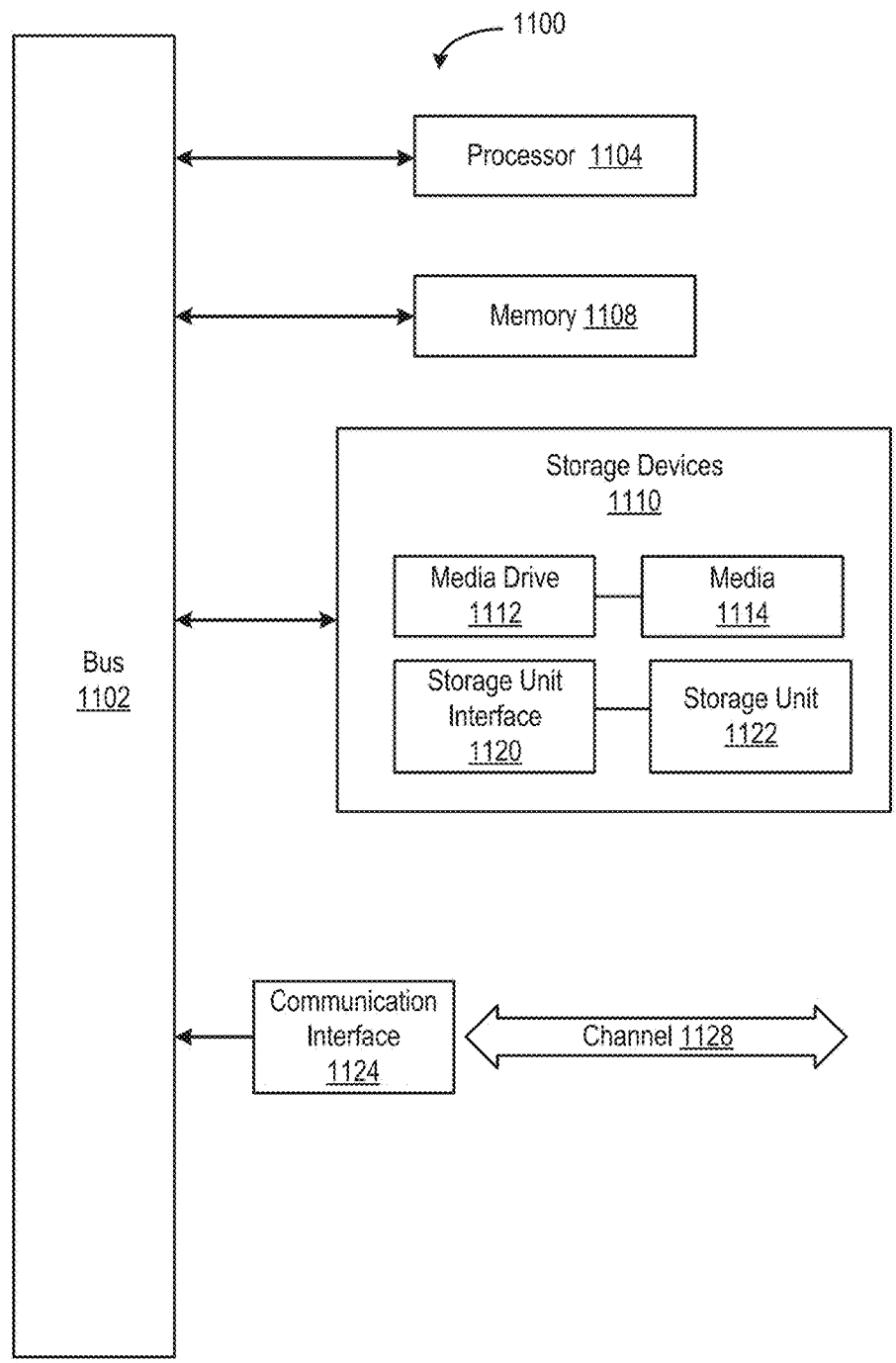
FIG. 11 illustrates an example of a computer system, according to an embodiment of the present technology.

FIG. 10 illustrates an example method 1000, according to an embodiment of the present technology. At block 1002, the method 1000 can transmit a communication to a first computing device associated with a first person, wherein the communication includes an indication that the communication is from a phone number. At block 1004, the method 1000 can receive a response to the communication from the first computing device. At block 1006, the method 1000 can route the response to a second computing device associated with a second person and a second phone number. At block 1008, the method 1000 can receive a reply to the response from the second computing device. At block 1010, the method 1000 can transmit the reply to the first computing device, wherein the reply includes an indication that the reply is from the phone number. Other suitable techniques that incorporate various features and embodiments of the present technology are possible.

Where components or modules of the invention are implemented in whole or in part using software, in one embodiment, these software elements can be implemented to operate with a computing or processing module capable of carrying out the functionality described with respect thereto. One such example computing module is shown in FIG. 11. Various embodiments are described in terms of this example-computing module 900. After reading this description, it will become apparent to a person skilled in the relevant art how to implement the invention using other computing modules or architectures.

Referring now to FIG. 11, computing module 1100 may represent, for example, a computer system or computing or processing capabilities found within desktop, laptop and notebook computers; hand-held computing devices (PDA's, smart phones, cell phones, palmtops, tablets, etc.); mainframes, supercomputers, workstations or servers; or any other type of special-purpose or general-purpose computing devices as may be desirable or appropriate for a given application or environment. Computing module 1100 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

In some embodiments, some or all the elements of FIG. 11 may be emulated via "virtualization software," such as VMWare®, and others. Accordingly, various embodiments may utilize virtualization software that provides an execution environment using emulated hardware, such as a "virtual machine". The virtualized software may be implemented, and provided, as cloud-based services, such as Amazon Web Services Elastic Compute Cloud.

Computing module 1100 might include, for example, one or more processors, controllers, control modules, or other processing devices, such as a processor 1104. Processor 1104 might be implemented using a general-purpose or special-purpose processing engine such as, for example, a microprocessor, controller, or other control logic. In the illustrated example, processor 1104 is connected to a bus 1102, although any communication medium can be used to facilitate interaction with other components of computing module 1100 or to communicate externally.

Computing module 1100 might also include one or more memory modules, simply referred to herein as main memory 1108. For example, preferably random access memory (RAM) or other dynamic memory, might be used for storing information and instructions to be executed by processor 1104. Main memory 1108 might also be used for storing temporary variables or other intermediate information during execution of instructions to be executed by processor 1104. Computing module 1100 might likewise include a read only memory ("ROM") or other static storage device coupled to bus 1102 for storing static information and instructions for processor 1104.

The computing module 1100 might also include one or more various forms of information storage mechanism 1110, which might include, for example, a media drive 1112 and a storage unit interface 1120. The media drive 1112 might include a drive or other mechanism to support fixed or removable storage media 1114. For example, a hard disk drive, a floppy disk drive, a magnetic tape drive, an optical disk drive, a CD or DVD drive (R or RW), or other removable or fixed media drive might be provided. Accordingly, storage media 1114 might include, for example, a hard disk, a floppy disk, magnetic tape, cartridge, optical disk, a CD or DVD, or other fixed or removable medium that is read by, written to or accessed by media drive 1112. As these examples illustrate, the storage media 1114 can include a computer usable storage medium having stored therein computer software or data.

In alternative embodiments, information storage mechanism 1110 might include other similar instrumentalities for allowing computer programs or other instructions or data to be loaded into computing module 1100. Such instrumentalities might include, for example, a fixed or removable storage unit 1122 and an interface 1120. Examples of such storage units 1122 and interfaces 1120 can include a program cartridge and cartridge interface, a removable memory (for example, a flash memory or other removable memory module) and memory slot, a PCMCIA slot and card, and other fixed or removable storage units 1122 and interfaces 1120 that allow software and data to be transferred from the storage unit 1122 to computing module 1100.

Computing module 1100 might also include a communications interface 1124. Communications interface 1124 might be used to allow software and data to be transferred between computing module 1100 and external devices. Examples of communications interface 1124 might include a modem or softmodem, a network interface (such as an Ethernet, network interface card, WiMedia, IEEE 802.XX or other interface), a communications port (such as for example, a USB port, IR port, RS232 port, Bluetooth® interface, or other port), or other communications interface. Software and data transferred via communications interface 1124 might typically be carried on signals, which can be electronic, electromagnetic (which includes optical) or other signals capable of being exchanged by a given communications interface 1124. These signals might be provided to communications interface 1124 via a channel 1128. This channel 1128 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1108, storage unit 1120, media 1114, and channel 1128. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1100 to perform features or functions of the disclosed invention as discussed herein.

While various embodiments of the disclosed invention have been described above, it should be understood that they have been presented by way of example only, and not of limitation. Likewise, the various diagrams may depict an example architectural or other configuration for the disclosed invention, which is done to aid in understanding the features and functionality that can be included in the disclosed invention. The disclosed invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the invention disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed invention is described above in terms of various example embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed invention, whether or not such embodiments are described and whether or not such features are presented as being a part of a described embodiment. Thus, the breadth and scope of the invention disclosed herein should not be limited by any of the above-described example embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide example instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of example block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration

What is claimed is:

1. A computer-implemented method comprising:
   selecting, by a server, a channel for a communication, the channel relating to at least one of messaging, email, and mobile phone;
   transmitting, by the server, the communication to a first computing device associated with a first person and a first phone number, wherein the communication includes an indication that the communication is from a shared phone number;
   receiving, by the server, a response to the communication from the first computing device;
   routing, by the server, the response to a second computing device associated with a second person and a second phone number;
   receiving, by the server, a reply to the response from the second computing device; and
   transmitting, by the server, the reply to the first computing device, wherein the reply includes an indication that the reply is from the shared phone number,
   wherein a communication sent by the first computing device and intended for the second computing device sets the shared phone number as recipient, and wherein a communication sent by the second computing device and intended for the first computing device sets the shared phone number as recipient, and
   wherein the shared phone number is a business entity phone number, the first phone number is a phone number of a consumer of the business entity, and the second phone number is a phone number of a person associated with the business entity.

2. The computer-implemented method of claim 1, wherein the communication, the response, and the reply are text messages or phone calls.

3. The computer-implemented method of claim 1, wherein the reply to the first computing device does not include an indication that the reply is from the second phone number.

4. The computer-implemented method of claim 1, further comprising:
   associating the response with the shared phone number.

5. The computer-implemented method of claim 1, wherein the routing the response to a second computing device comprises:
   forwarding the response under the shared phone number.

6. The computer-implemented method of claim 1, further comprising:
   removing from the reply the second phone number associated with the second computing device.

7. The computer-implemented method of claim 1, further comprising:
   receiving a phone call from the first computing device based on dialing of the shared phone number;
   routing the phone call to the second computing device or a third computing device associated with a third person; and
   establishing voice communications between the first computing device and the second computing device.

8. The computer-implemented method of claim 1, wherein the communication is a text message, the method further comprising:
   determining a recipient for the communication, a time to send the communication to the recipient, and content for the communication based on configuration parameters applied to one or more rules.

9. The computer-implemented method of claim 1, wherein the channel for the communication is selected based on at least one of urgency of the communication, operability of the channel, availability of the channel, latency of the channel, and communication variety.

10. A system comprising:
    at least one processor; and
    a memory storing instructions that, when executed by the at least one processor, cause the system to perform:
    selecting a channel for a communication, the channel relating to at least one of messaging, email, and mobile phone;
    transmitting the communication to a first computing device associated with a first person and a first phone number, wherein the communication includes an indication that the communication is from a shared phone number;
    receiving a response to the communication from the first computing device;
    routing the response to a second computing device associated with a second person and a second phone number;
    receiving a reply to the response from the second computing device; and
    transmitting the reply to the first computing device, wherein the reply includes an indication that the reply is from the shared phone number,
    wherein a communication sent by the first computing device and intended for the second computing device sets the shared phone number as recipient, and wherein a communication sent by the second computing device and intended for the first computing device sets the shared phone number as recipient, and
    wherein the shared phone number is a business entity phone number, the first phone number is a phone number of a consumer of the business entity, and the second phone number is a phone number of a person associated with the business entity.

11. The system of claim 10, wherein the communication, the response, and the reply are text messages or phone calls.

12. The system of claim 10, wherein the reply to the first computing device does not include an indication that the reply is from the second phone number.

13. The system of claim 10, further comprising:
    associating the response with the shared phone number.

14. The system of claim 10, wherein the routing the response to a second computing device comprises:
    forwarding the response under the shared phone number.

15. A non-transitory computer-readable storage medium including instructions that, when executed by at least one processor of a computing system, cause the computing system to perform a method comprising:
    selecting a channel for a communication, the channel relating to at least one of messaging, email, and mobile phone;
    transmitting the communication to a first computing device associated with a first person and a first phone number, wherein the communication includes an indication that the communication is from a shared phone number;
    receiving a response to the communication from the first computing device;

routing the response to a second computing device associated with a second person and a second phone number;

receiving a reply to the response from the second computing device; and transmitting the reply to the first computing device, wherein the reply includes an indication that the reply is from the shared phone number, wherein a communication sent by the first computing device and intended for the second computing device sets the shared phone number as recipient, and wherein a communication sent by the second computing device and intended for the first computing device sets the shared phone number as recipient, and wherein the shared phone number is a business entity phone number, the first phone number is a phone number of a consumer of the business entity, and the second phone number is a phone number of a person associated with the business entity.

16. The non-transitory computer-readable storage medium of claim 15, wherein the communication, the response, and the reply are text messages or phone calls.

17. The non-transitory computer-readable storage medium of claim 15, wherein the reply to the first computing device does not include an indication that the reply is from the second phone number.

18. The non-transitory computer-readable storage medium of claim 15, further comprising:

associating the response with the shared phone number.

19. The non-transitory computer-readable storage medium of claim 15, wherein the routing the response to a second computing device comprises:

forwarding the response under the shared phone number.

* * * * *